US010780742B2

(12) United States Patent
Sakata (10) Patent No.: US 10,780,742 B2
(45) Date of Patent: Sep. 22, 2020

(54) TIRE

(71) Applicant: TOYO TIRE & RUBBER CO., LTD., Itami-shi, Hyogo (JP)

(72) Inventor: Hirokazu Sakata, Itami (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 389 days.

(21) Appl. No.: 15/798,895

(22) Filed: Oct. 31, 2017

(65) Prior Publication Data
US 2018/0186192 A1    Jul. 5, 2018

(30) Foreign Application Priority Data

Jan. 5, 2017  (JP) ................................ 2017-000529

(51) Int. Cl.
*B60C 11/00*    (2006.01)
*B29D 30/60*    (2006.01)

(52) U.S. Cl.
CPC ............ *B60C 11/005* (2013.01); *B29D 30/60* (2013.01); *B60C 11/0058* (2013.01); *B60C 11/0075* (2013.01); *B60C 2011/0025* (2013.01); *B60C 2011/0033* (2013.01); *B60C 2011/0091* (2013.01)

(58) Field of Classification Search
CPC ......... B60C 11/0058; B60C 2011/0091; B60C 11/0075
See application file for complete search history.

(56) References Cited

U.S. PATENT DOCUMENTS

| | | | |
|---|---|---|---|
| 2007/0006953 A1* | 1/2007 | Galimberti | ............ B60C 1/0016 152/209.5 |
| 2007/0295433 A1* | 12/2007 | Losi | ...................... B29D 30/62 152/209.5 |
| 2009/0126846 A1* | 5/2009 | Tada | .................. B29D 30/3028 152/526 |
| 2013/0133812 A1* | 5/2013 | Abe | ....................... B29D 30/10 156/117 |
| 2017/0050469 A1* | 2/2017 | Hashimoto | ............. B60C 11/00 |

FOREIGN PATENT DOCUMENTS

| | | | | |
|---|---|---|---|---|
| JP | 2006-168564 | A | * | 6/2006 |
| JP | 2006-168564 | A | | 6/2006 |
| JP | 2007-001430 | A | * | 1/2007 |
| JP | 2010-215115 | A | * | 9/2010 |
| JP | 2017-109638 | A | * | 6/2017 |

OTHER PUBLICATIONS

Machine translation for Japan 2010-215115 (Year: 2019).*
Machine translation for Japan 2007-001430 (Year: 2019).*
Machine translation for Japan 2006-168564 (Year: 2019).*
Machine translation for Japan 2017-109638 (Year: 2019).*

* cited by examiner

*Primary Examiner* — Steven D Maki
(74) *Attorney, Agent, or Firm* — Westerman, Hattori, Daniels & Adrian, LLP (57) ABSTRACT

In a tire, a tread rubber includes a first layer which is grounded on a road surface in an outer peripheral surface thereof, and a second layer which is joined to an inner peripheral surface of the first layer in an outer peripheral surface thereof, the first layer includes a joint portion where rubbers having different elastic modulus are joined, and the second layer is formed by a rubber having a greater elastic modulus than an elastic modulus of at least one of the rubbers constructing the first layer.

11 Claims, 8 Drawing Sheets

TIRE

CROSS REFERENCE TO RELATED APPLICATIONS

This application claims the benefit of priority of Japanese application no. 2017-529, filed on Jan. 5, 2017, which is incorporated herein by reference.

BACKGROUND OF THE INVENTION

Field of the Invention

The present invention relates to a tire having a tread rubber which is grounded on a road surface in an outer peripheral surface thereof.

Description of the Related Art

There has been conventionally known a tire having a tread rubber which is formed by two kinds of rubber having different elastic modulus while expecting a desired effect, as a tire (for example, JP-A-2006-168564). In the meantime, since a rigidity difference exists due to the different elastic modulus, a difference is generated in deformation at the traveling time. For example, the deformation is enlarged in the rubber having the smaller elastic modulus. As a result, since a ground pressure on a road surface is uneven, steering stability has been lowered.

SUMMARY OF THE INVENTION

Accordingly, an object of the present invention is to provide a tire which can inhibit a ground pressure on a road surface from being uneven even in the case that rubbers having different elastic modulus are used in an outer peripheral surface.

There is provided a tire, which includes:

a tread rubber which is grounded on a road surface in an outer peripheral surface thereof, wherein the tread rubber includes a first layer which is grounded on the road surface in an outer peripheral surface thereof, and a second layer which is joined to an inner peripheral surface of the first layer in an outer peripheral surface thereof, wherein the first layer includes a joint portion where rubbers having different elastic modulus are joined, and wherein the second layer is formed by a rubber having a greater elastic modulus than an elastic modulus of at least one of the rubbers constructing the first layer.

Further, the tire according to the present invention may have a configuration in which:

the tread rubber includes a third layer which is joined to an inner peripheral surface of the second layer in an outer peripheral surface thereof, and wherein the third layer includes a joint portion where the rubbers having the different elastic modulus are joined.

Further, the tire according to the present invention may have a configuration in which:

the tread rubber includes a peripheral groove which extends along a tire peripheral direction, and wherein the third layer is arranged in such a manner as to include a position of a groove bottom of the peripheral groove in a tire radial direction.

Further, the tire according to the present invention may have a configuration in which:

the joint portion includes a peripheral joint portion where the rubbers having the different elastic modulus are joined in a tire peripheral direction, and a width joint portion where the rubbers having the different elastic modulus are joined in a tire width direction.

Further, the tire according to the present invention may have a configuration in which:

the elastic modulus of the rubber which forms the second layer is different from the elastic modulus of all the rubbers which form the first layer.

Further, the tire according to the present invention may have a configuration in which:

the elastic modulus of the rubber which forms the second layer is greater than the elastic modulus of all the rubbers which form the first layer.

Further, the tire according to the present invention may have a configuration in which:

a dimension of the second layer in a tire radial direction is equal to or less than a dimension of the first layer in the tire radial direction.

Further, the tire according to the present invention may have a configuration in which:

the elastic modulus of the rubber which forms the second layer is different from the elastic modulus of all the rubbers which form the third layer.

Further, the tire according to the present invention may have a configuration in which:

wherein the elastic modulus of the rubber which forms the second layer is greater than the elastic modulus of all the rubbers which form the third layer.

Further, the tire according to the present invention may have a configuration in which:

wherein a dimension of the second layer in a tire radial direction is equal to or less than a dimension of the third layer in the tire radial direction.

Further, the tire according to the present invention may have a configuration in which:

the first layer is formed by spirally winding a plurality of ribbon rubbers along a tire peripheral direction, wherein the ribbon rubbers are provided with parallel portions which are arranged in parallel to the tire peripheral direction, and inclined portions which are arranged so as to be inclined to the tire peripheral direction, wherein the peripheral joint portions are formed so that the inclined portions are joined to each other in the tire peripheral direction, and wherein the width joint portions are formed by joining the parallel portions to each other in the tire width direction.

Further, the tire according to the present invention may have a configuration in which:

the first layer is formed by first and second rubbers having different elastic modulus, wherein the elastic modulus of the first rubber is smaller than the elastic modulus of the second rubber, and wherein a dimension in a tire radial direction of a portion which is formed by the first rubber in the first layer is smaller than a dimension in the tire radial direction of a portion which is formed by the second rubber in the first layer.

As mentioned above, the tire achieves an excellent effect that it is possible to inhibit the ground pressure on the road surface from being uneven even in the case that the rubbers having the different elastic modulus are used in the outer peripheral surface.

DETAILED DESCRIPTION OF THE INVENTION

A description will be given below of an embodiment in a tire with reference to FIGS. 1 to 8. In each of the drawings (same applies to FIGS. 9 to 11), an actual dimensional ratio does not necessarily coincide with a dimensional ratio of the drawing, and the dimensional ratio does not coincide between the drawings.

Figure 1:
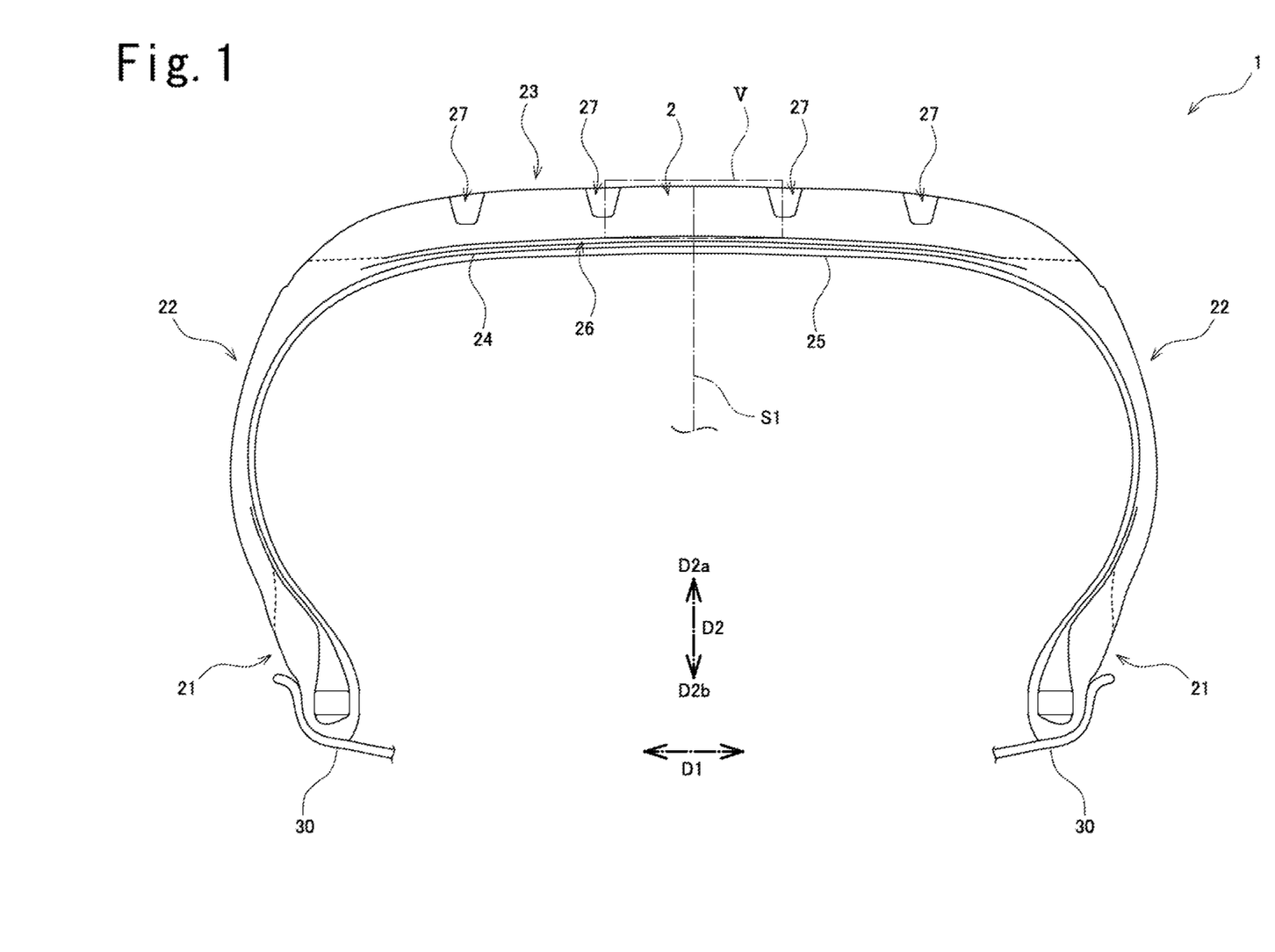
FIG. 1 is a cross sectional view of a substantial part in a tire meridian surface of a tire according to an embodiment.

As shown in FIG. 1, a tire 1 according to the present embodiment is provided with a pair of bead portions 21 which have beads, side wall portions 22 which extend to outer sides in a tire radial direction D2 from the respective bead portions 21, and a tread portion 23 which is connected to outer end portions of the pair of side wall portions 22 in the tire radial direction D2 and is grounded on a road surface in an outer peripheral surface (a tread surface) in the tire radial direction D2. In the present embodiment, the tire 1 is a pneumatic tire which is internally filled with air, and is installed to a rim 30.

Further, the tire 1 is provided with a carcass layer 24 which is bridged between a pair of beads, and an inner liner 25 which is arranged in an inner side of the carcass layer 24 and is excellent in a function of blocking gas transmission for retaining the pneumatic pressure. The carcass layer 24 and the inner liner 25 are arranged along a tire inner periphery over the bead portions 21, the side wall portions 22 and the tread portion 23.

In FIG. 1 (same applies to the following drawings), a first direction D1 is a tire width direction D1, a second direction D2 is the tire radial direction D2 which is a diametrical direction of the tire 1, and a third direction D3 (refer to FIGS. 2 to 4) is a tire peripheral direction D3 which is a direction around a tire rotation axis. One direction D2a in the tire radial direction D2 is an outside direction of the tire radial direction, and the other direction D2b is an inside direction of the tire radial direction.

Further, a tire equator surface S1 is a surface which is orthogonal to the tire rotation axis and is also a surface which is positioned at the center in the tire width direction D1. Further, a tire meridian surface S2 (refer to FIGS. 2 to 4) is a surface which includes the tire rotation axis and is also a surface which is orthogonal to the tire equator surface S1.

The tread portion 23 is provided with a tread rubber 2 which is grounded on the road surface in an outer peripheral surface, and a belt layer 26 which is arranged between the tread rubber 2 and the carcass layer 24. Further, the tread rubber 2 is provided with a plurality of peripheral grooves 27 which extend along a tire peripheral direction D3, and a plurality of land grooves (not shown) which extend so as to intersect the tire peripheral direction D3, on an outside surface thereof.

The tread rubber 2 is provided with a cap rubber 3 which is grounded on a road surface in an outer peripheral surface thereof, and a base rubber 4 which is arranged between the cap rubber 3 and the belt layer 26. Further, the cap rubber 3 is provided with a first layer 3a which is grounded on the road surface in an outer peripheral surface thereof, a second layer 3b which is joined to an inner peripheral surface of the first layer 3a in an outer peripheral surface thereof, and a third layer 3c which is joined to an inner peripheral surface of the second layer 3b in an outer peripheral surface thereof.

Therefore, in the present embodiment, the tread rubber 2 is formed into a four-layer structure which is constructed by the first layer 3a, the second layer 3b, the third layer 3c and the base rubber 4. Further, the cap rubber 3 is formed into a three-layer structure which is constructed by the first layer 3a, the second layer 3b and the third layer 3c.

As shown in FIGS. 2 to 5, the cap rubber 3 is formed by spirally winding first and second ribbon rubbers 5 and 6 along the tire peripheral direction D3. Further, the cap rubber 3 is formed by winding the first and second ribbon rubbers 5 and 6 to form three layers in the tire radial direction D2. As a result, the cap rubber 3 is formed into a three-layer structure which is constructed by the first layer 3a, the second layer 3b, and the third layer 3c.

Figure 2:
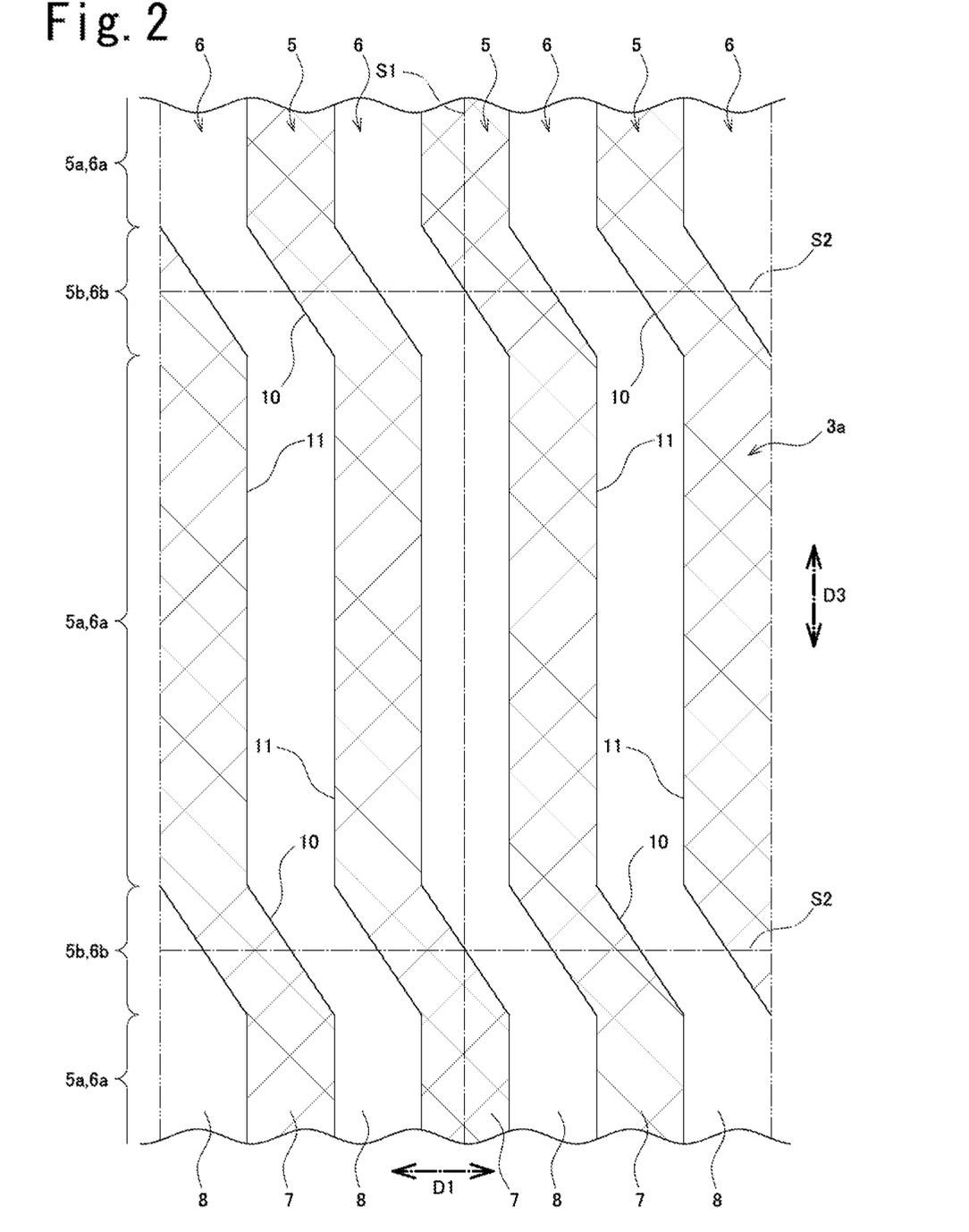
FIG. 2 is a development view of a substantial part of a first layer of a tread rubber according to the embodiment and is a view for describing a layout of the rubber.
Figure 3:
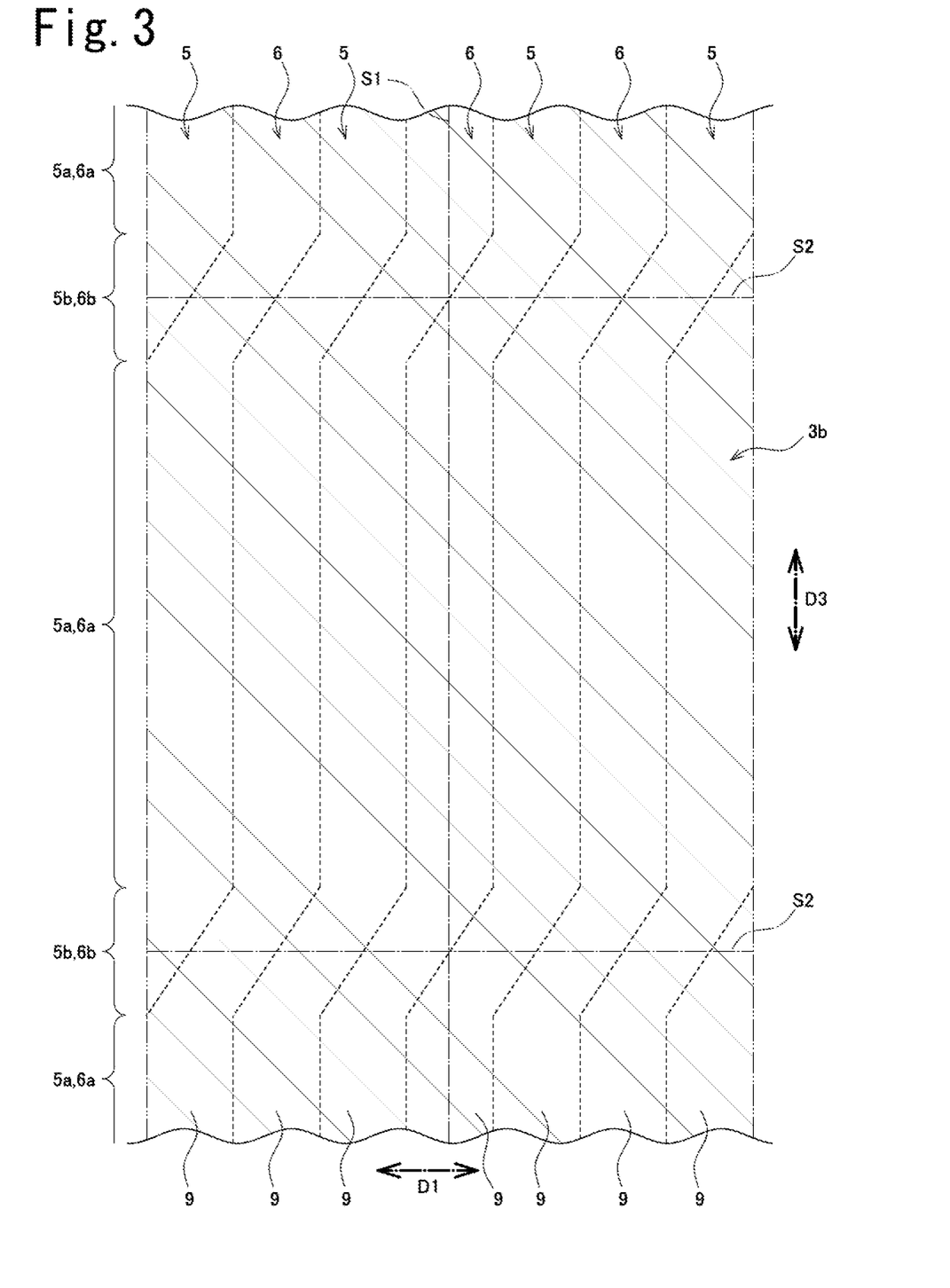
FIG. 3 is a development view of a substantial part of a second layer of the tread rubber according to the embodiment and is a view for describing a layout of the rubber.
Figure 4:
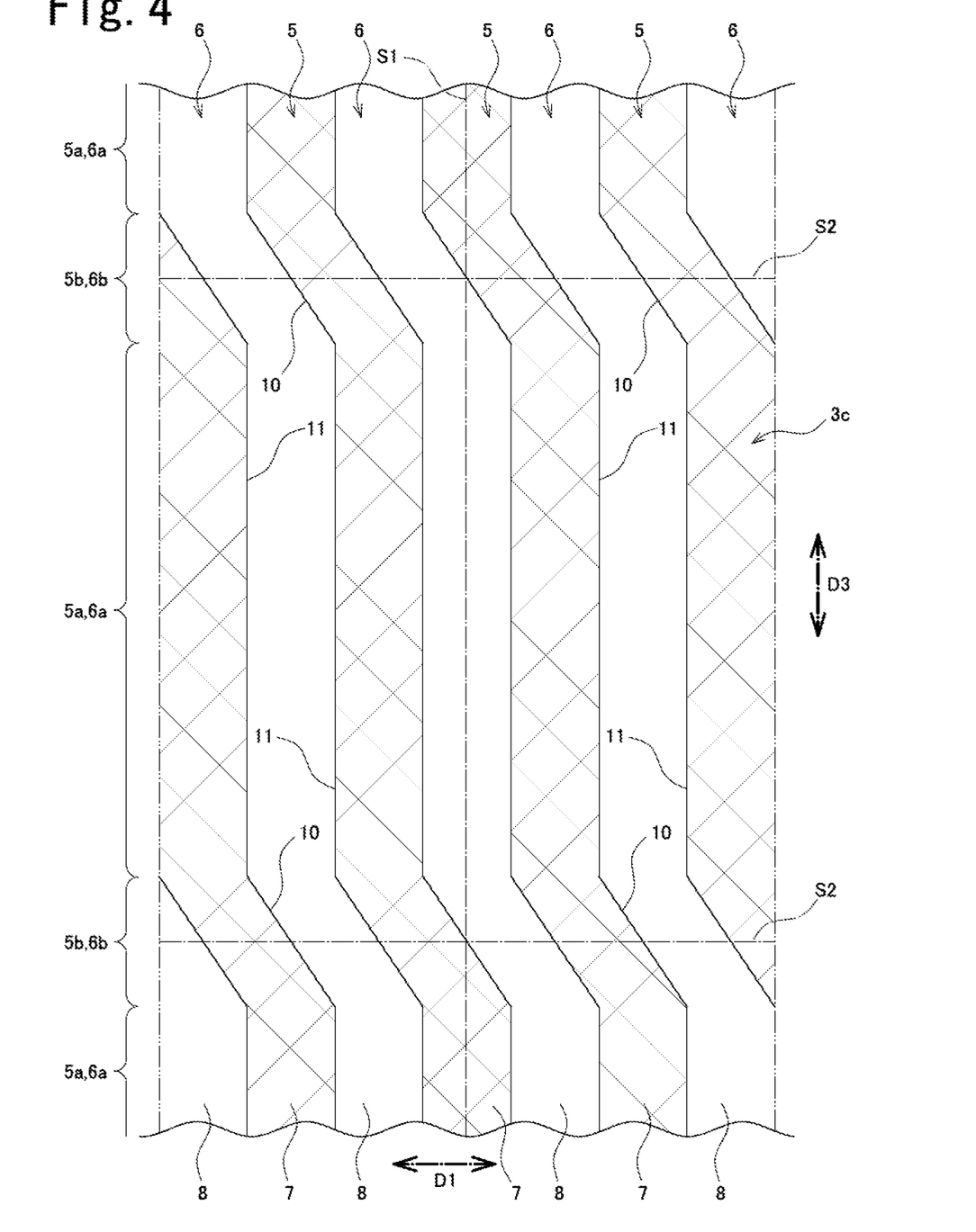
FIG. 4 is a development view of a substantial part of a third layer of the tread rubber according to the embodiment and is a view for describing a layout of the rubber.

FIG. 2 shows a layout of the first and second ribbon rubbers 5 and 6 in the first layer 3a, FIG. 3 shows a layout of the first and second ribbon rubbers 5 and 6 in the second layer 3b at the same position as FIG. 2, and FIG. 4 shows a layout of the first and second ribbon rubbers 5 and 6 in the third layer 3c at the same position as FIG. 2. Further, in FIGS. 2 to 4, a plane S2 indicates a predetermined (same) tire meridian surface S2.

Cross sectional shapes of the first and second ribbon rubbers 5 and 6 are approximately the same. More specifically, dimensions of the first and second ribbon rubbers 5 and 6 in the respective directions D1 and D2 are approximately the same. The cross sectional shapes of the first and second ribbon rubbers 5 and 6 can be formed into various cross sectional shapes in correspondence to an aspect of the tread rubber 2 (the cap rubber 3) to be formed. For example, the cross sectional shapes of the first and second ribbon rubbers 5 and 6 can be formed into an approximately triangular shape, an approximately trapezoidal shape and a tabular shape.

In the meantime, the cap rubber 3 is formed by first to third rubbers 7 to 9 having different elastic modulus. Further, the elastic modulus of the second rubber 8 is greater than the elastic modulus of the first rubber 7. Further, the elastic modulus of the third rubber 9 is greater than the elastic modulus of the first rubber 7 and the second rubber 8.

In FIGS. 2 to 5 (same applies to the following drawings), the first rubber 7 is illustrated by a hatching line area, the second rubber 8 is illustrated by a plain area, and the third rubber 9 is illustrated by a (diagonally left up) oblique line area. Further, in FIGS. 2 to 5 (same applies to the following drawings), in a portion where the ribbon rubbers 5 and 6 are joined, joint portions 10 to 12 where the different kinds of rubber are joined are illustrated by solid lines, and boundary portions where rubbers of the same kind are joined are illustrated by broken lines.

The elastic modulus is a tensile elastic modulus and is a value obtained by measuring at a room temperature (25° C.) according to a method which is defined in JIS K6251. For example, the elastic modulus of the second rubber 8 is preferably between 1.2 times and 5.0 times of the elastic modulus of the first rubber 7, and for example, the elastic modulus of the third rubber 9 is preferably between 1.3 times and 5.5 times of the elastic modulus of the first rubber 7.

For example, a 100% tensile elastic modulus of the first rubber 7 is preferably between 0.5 MPa and 3.5 MPa. Further, for example, a 100% tensile elastic modulus of the second rubber 8 is preferably between 0.6 MPa and 17.5 MPa. Further, for example, a 100% tensile elastic modulus of the third rubber 9 is preferably between 0.7 MPa and 19.3 MPa.

As shown in FIGS. 2 to 4, the respective ribbon rubbers 5 and 6 are provided with parallel portions 5a and 6a which are arranged in parallel to the tire peripheral direction D3, and inclined portions 5b and 6b which are arranged so as to be inclined to the tire peripheral direction D3. Further, the respective ribbon rubbers 5 and 6 are arranged so that the parallel portions 5a and 6a and the inclined portions 5b and 6b are repeatedly connected.

Further, each of the parallel portions 5a and 6a and the inclined portions 5b and 6b of the first and second ribbon rubbers 5 and 6 is alternately arranged in the tire width direction D1. The dimension of the parallel portions 5a and 6a in the tire peripheral direction D3 is greater than the dimension of the inclined portions 5b and 6b in the tire peripheral direction D3.

As shown in FIGS. 2 and 4, the first layer 3a and the third layer 3c are provided with a plurality of peripheral joint portions 10 where the first rubber 7 and the second rubber 8 are joined in the tire peripheral direction D3. The peripheral joint portion 10 is formed by joining the inclined portion 5b which is formed by the first rubber 7 of the first ribbon rubber 5 and the inclined portion 6b which is formed by the second rubber 8 of the second ribbon rubber 6 in the tire peripheral direction D3.

Further, the peripheral joint portion 10 is arranged so as to intersect the tire peripheral direction D3. Specifically, the peripheral joint portion 10 is arranged so as to be inclined to and intersect the tire peripheral direction D3. For example, an intersecting angle of the peripheral joint portion 10 in the tire peripheral direction D3 is preferably equal to or more than 20 degrees, and is more preferably equal to or more than 30 degrees, and is still more preferably equal to or more than 45 degrees.

In the present embodiment, the plural peripheral joint portions 10 are arranged side by side in the tire width direction D1, and are arranged respectively at predetermined positions of the tire meridian surface S2. More specifically, a first group (the upper side peripheral joint portions 10 in FIGS. 2 and 4) of the peripheral joint portions 10 are arranged to be away from a second group (the lower side peripheral joint portions 10 in FIGS. 2 and 4) of the peripheral joint portions 10 at a distance corresponding to about 180 degrees in the tire peripheral direction D3.

Further, the first layer 3a and the third layer 3c are provided with a plurality of width joint portions 11 where the first rubber 7 and the second rubber 8 are joined in the tire width direction D1. The width joint portion 11 is formed by joining the parallel portion 5a which is formed by the first rubber 7 of the first ribbon rubber 5 and the parallel portion 6a which is formed by the second rubber 8 of the second ribbon rubber 6 in the tire width direction D1.

Further, the width joint portion 11 is arranged so as to intersect in the tire width direction D1. The width joint portion 11 includes a portion which is arranged so as to slightly intersect in the tire peripheral direction D3. For example, the width joint portion 11 includes a portion in which an intersecting angle in the tire peripheral direction D3 is less than 10 degrees.

As shown in FIG. 3, the second layer 3b is formed only by the third rubber 9. Specifically, the second layer 3b is formed by joining the parallel portion 5a and the inclined portion 5b which are formed by the third rubber 9 of the first ribbon rubber 5, and the parallel portion 6a and the inclined portion 6b which are formed by the third rubber 9 of the second ribbon rubber 6.

Figure 5:
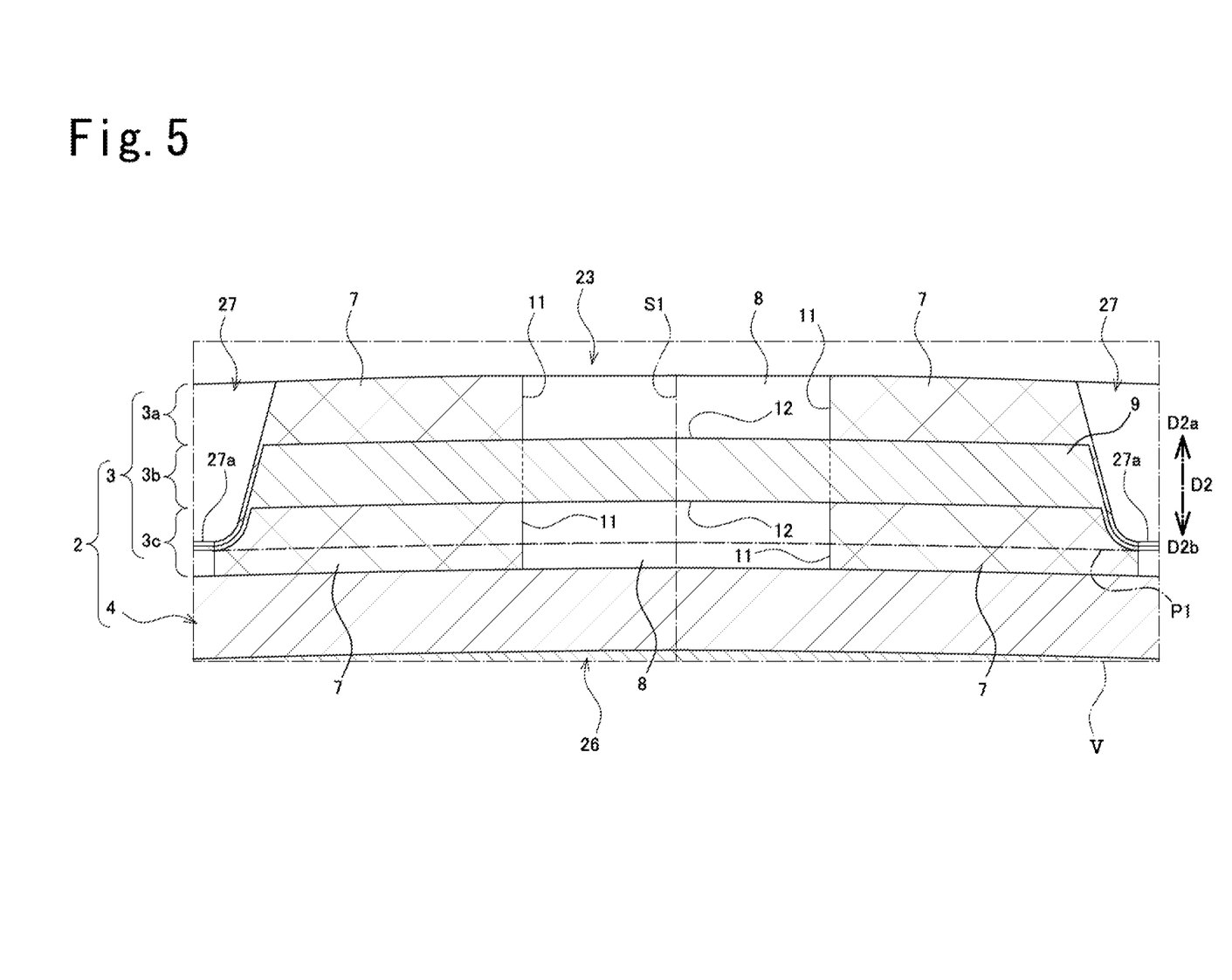
FIG. 5 is an enlarged view of an area V in FIG. 1 and is a view for describing the layout of the rubber.

As shown in FIG. 5, the cap rubber 3 is provided with a radial joint portion 12 by which the first rubber 7 or the second rubber 8 and the third rubber 9 are joined in the tire radial direction D2, between the first layer 3a and the second layer 3b. Further, the cap rubber 3 is provided with the radial joint portion 12 by which the first rubber 7 or the second rubber 8 and the third rubber 9 are joined in the tire radial direction D2, between the second layer 3b and the third layer 3c.

A dimension of the second layer 3b in the tire radial direction D2 is equal to or less than a dimension of the first layer 3a in the tire radial direction D2, and is equal to or less than a dimension of the third layer 3c in the tire radial direction. Further, an outer peripheral surface of the second layer 3b is arranged closer to an outer side in the tire radial direction D2 than a groove bottom 27a of the peripheral groove 27. Specifically, a whole of the second layer 3b is arranged closer to the outer side in the tire radial direction D2 than a position P1 of the groove bottom 27a of the peripheral groove 27. Further, the third layer 3c is arranged in such a manner as to include the position P1 of the groove bottom 27a of the peripheral groove 27 in the tire radial direction D2.

The base rubber 4 is joined with an outer peripheral surface of the belt layer 26 in the tire radial direction D2, and is formed by one kind of rubber having a predetermined elastic modulus. For example, the base rubber 4 is formed by winding one piece of band-shaped rubber so as to be arranged along the tire peripheral direction D3. In the present embodiment, the elastic modulus of the first to third rubbers 7 to 9 are greater than the elastic modulus of the rubber which forms the base rubber 4. In FIG. 5 (same applies to the following drawings), the rubber of the base rubber 4 is illustrated by a (diagonally right up) oblique line area.

The structure of the tire 1 according to the present embodiment is as described above, and a description will be given next of an operation and effect of the tire 1 according to the present embodiment.

First of all, there is a case that the tread rubber 2 cannot be elastically deformed sufficiently at an early stage of the operation where the temperature of the tread rubber 2 is low. As a result, for example, the tread rubber 2 can not ground on the road surface sufficiently over all. Therefore, there is a case that it is impossible to sufficiently achieve an edge effect (an effect that edges scratch the road surface at the traveling time and generate a grip force against the road surface) on the basis of the grooves such as the peripheral grooves 27 and the land grooves.

On the contrary, the first layer 3a and the third layer 3c of the cap rubber 3 are provided with the peripheral joint portion 10 and the width joint portion 11. Further, the cap rubber 3 is provided with the radial joint portions 12 between the first layer 3a and the second layer 3b and between the third layer 3c and the second layer 3b.

As a result, since the tire 1 is exposed to the force in each of the directions D1 to D3 when the vehicle travels, each of the joint portions 10 to 12 is elastically deformed. At this time, since each of the joint portions 10 to 12 is formed by joining the rubbers 7 to 9 having the different elastic modulus, each of the joint portions 10 to 12 is elastically deformed so as to strain. Therefore, each of the joint portions 10 to 12 generates heat, and it is possible to raise the temperature of the tread rubber 2 at an early stage of the operation.

Figure 6:
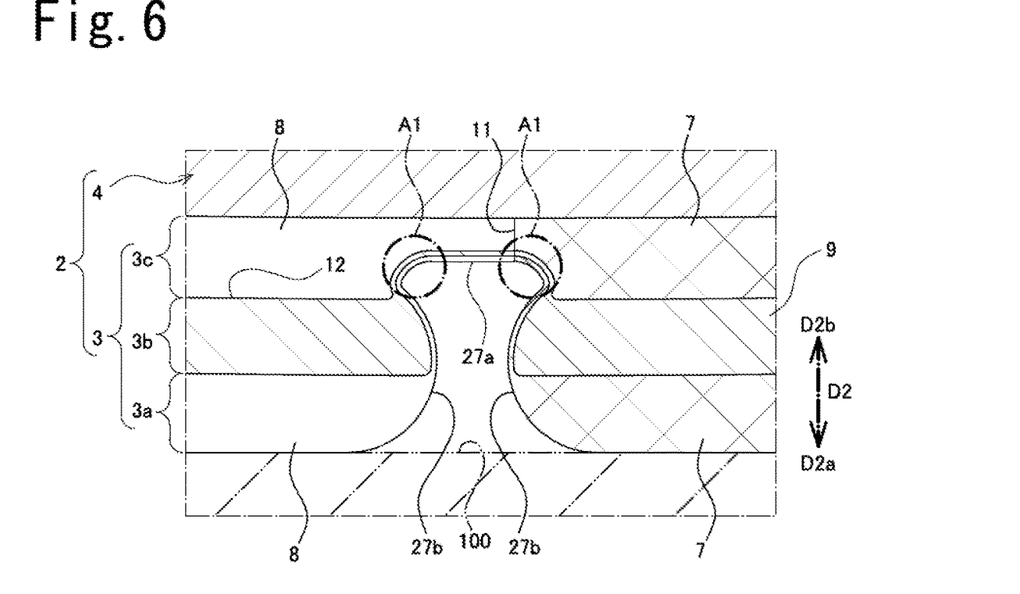
FIG. 6 is an enlarged cross sectional view of a substantia part for describing an action of the tread rubber according to the embodiment and is a view for describing a layout of the rubber.

Further, as shown in FIG. 6, the tire 1 tends to be deformed in the vicinity of the groove when grounding on the road surface 100. For example, the tire is deformed in the peripheral groove 27 so that a groove wall 27b bulges inside while a groove bottom 27a is a starting point of the compression deformation. Therefore, a groove bottom area A1 repeats the compressive elastic deformation and the restoration thereof.

On the contrary, the third layer 3c is arranged in such a manner as to include the position P1 of the groove bottom 27a of the peripheral groove 27 in the tire radial direction D2. As a result, since the peripheral joint portion 10 and the width joint portion 11 of the third layer 3c are arranged in the groove bottom area A1 which repeats the compressive elastic deformation and the restoration thereof, it is possible to effectively generate heat by the third layer 3c. Therefore, it is possible to effectively raise the temperature of the tread rubber 2 at an early stage of the operation.

As mentioned above, since the tread rubber 2 has the sufficient temperature at an early stage of the operation, the tread rubber 2 can be elastically deformed sufficiently. As a result, it is possible to ground an outer peripheral surface of the tread rubber 2 over all. Therefore, since the edge effect on the basis of the grooves (the peripheral grooves 27 and the land grooves) can be sufficiently achieved, it is possible to improve the steering stability at an early stage of the operation.

In the meantime, since the first layer 3a is formed by the first and second rubbers 7 and 8 having the different elastic modulus, the rigidity difference exists due to the different elastic modulus. On the contrary, the elastic modulus of the third rubber 9 which forms the second layer 3b is greater than the elastic modulus of the first and second rubbers 7 and 8 which form the first layer 3a. As a result, it is possible to reduce the rigidity difference caused by the different elastic modulus of the first and second rubbers 8 and 9 of the first layer 3a.

Therefore, since it is possible to inhibit the deformation difference from being enlarged due to the rigidity difference of the first layer 3a when the vehicle travels, it is possible to inhibit the ground pressure on the road surface from being uneven. As a result, the steering stability can be improved even after the tire 1 reaches a saturation temperature. As mentioned above, the tire 1 according to the present embodiment can improve the steering stability at an early stage of the operation and even after the tire 1 reaches the saturation temperature.

Next, a description will be given of a method of manufacturing the tire 1 according to the present embodiment with reference to FIGS. 7 and 8.

Figure 7:
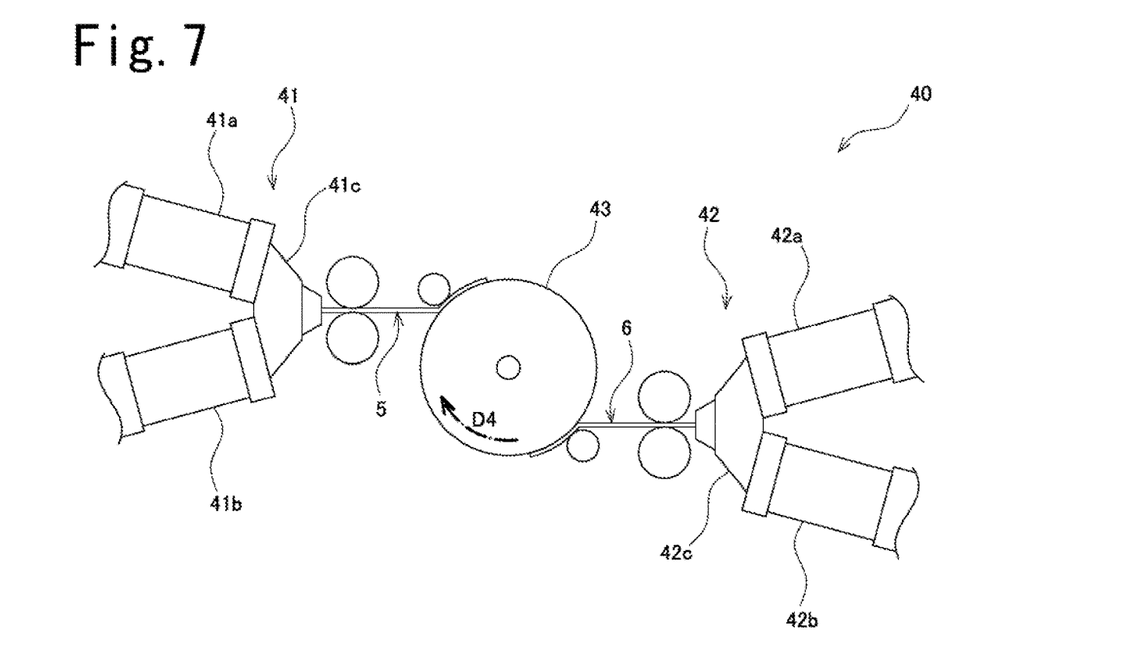
FIG. 7 is a schematic view for describing a method of manufacturing the tire according to the embodiment.

As shown in FIG. 7, a molding device 40 is provided with a first extruding device 41 which extrudes the first ribbon rubber 5, and a second extruding device 42 which extrudes the second ribbon rubber 6. Further, the molding device 40 is provided with a winding portion 43 to which the cord-shaped ribbon rubbers 5 and 6 formed by being extruded out of the respective extruding devices 41 and 42 are wound.

The extruding devices 41 and 42 extrude the rubbers 7 to 9 in such a manner that the cross sectional shapes of the ribbon rubbers 5 and 6 come to the fixed shapes. Further, the extruding devices 41 and 42 extrude the rubbers 7 to 9 in such a manner that extruding amounts of the rubbers 7 to 9 per unit time are fixed. Further, the first extruding device 41 and the second extruding device 42 are arranged so as to be opposed in a diametrical direction of the winding portion 43 via the winding portion 43.

The first extruding device 41 is provided with a first extruding portion 41a which extrudes the first rubber 7, a second extruding portion 41b which extrudes the third rubber 9, and a switch portion 41c which switches the rubbers 7 and 9 to be extruded to the external portion. Further, the first extruding device 41 extrudes the first ribbon rubber 5 in which the first rubber 7 forming the first layer 3a and the third layer 3c and the third rubber 9 forming the second layer 3b are alternately connected.

The second extruding device 42 is provided with a first extruding portion 42a which extrudes the second rubber 8, a second extruding portion 42b which extrudes the third rubber 9, and a switch portion 42c which switches the rubbers 8 and 9 to be extruded to the external portion. Further, the second extruding device 42 extrudes the second ribbon rubber 6 in which the second rubber 8 forming the first layer 3a and the third layer 3c and the third rubber 9 forming the second layer 3b are alternately connected.

The winding portion 43 is formed into a columnar shape, and can rotate around an axis (in a rotating direction D4). As a result, the ribbon rubbers 5 and 6 formed by being extruded on the basis of the rotation of the winding portion 43 are wound to the outer peripheral portion of the winding portion 43. Further, since the winding portion 43 is movable in the axial direction, the winding portion 43 can relatively displace in the axial direction in relation to the extruding devices 41 and 42.

Further, when the winding portion 43 is immovable in relation to the extruding devices 41 and 42, the parallel portions 5a and 6a of the ribbon rubbers 5 and 6 are formed, and when the winding portion 43 moves in the axial direction in relation to the extruding devices 41 and 42, the inclined portions 5b and 6b of the ribbon rubbers 5 and 6 are formed. As a result, as shown in FIG. 8, the ribbon rubbers 5 and 6 are arranged in such a manner that the parallel portions 5a and 6a and the inclined portions 5b and 6b are repeatedly connected, and the parallel portions 5a and 6a and the inclined portions 5b and 6b of the first and second ribbon rubbers 5 and 6 are arranged alternately in the tire width direction D1.

Further, since the inclined portion 5b formed by the first rubber 7 in the first ribbon rubber 5 and the inclined portion 6b formed by the second rubber 8 in the second ribbon rubber 6 are joined in the tire peripheral direction D3, the peripheral joint portions 10 are formed. Further, since the parallel portion 5a formed by the first rubber 7 in the first ribbon rubber 5 and the parallel portion 6a formed by the second rubber 8 in the second ribbon rubber 6 are joined in the tire width direction D1, the width joint portions 11 are formed. The peripheral joint portions 10 are arranged to be away at a distance corresponding to 180 degrees in the tire peripheral direction D3.

Figure 8:
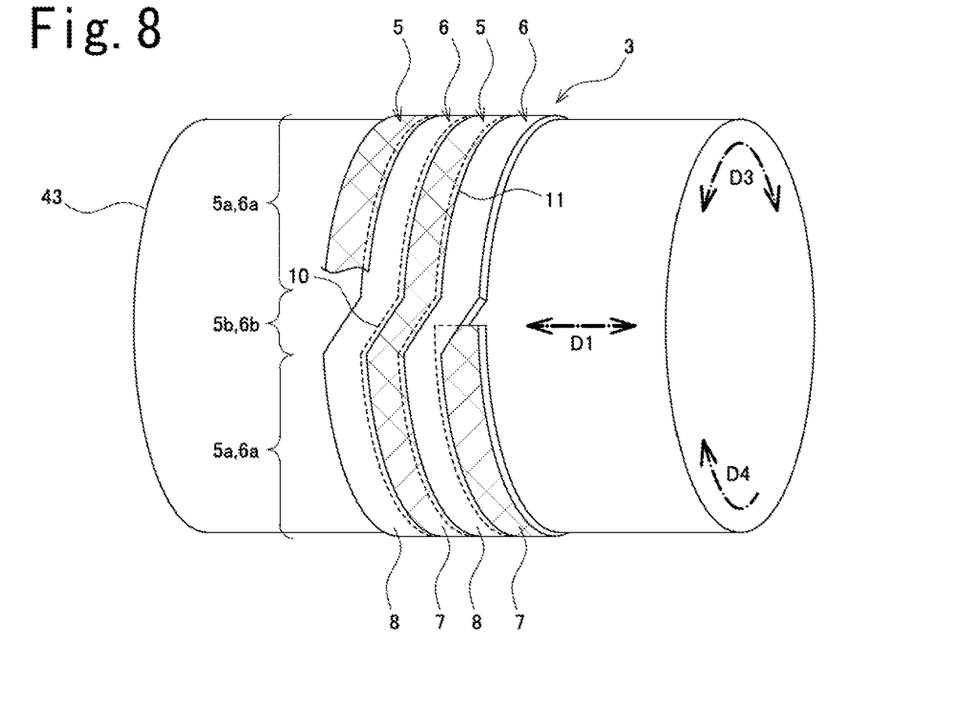
FIG. 8 is a schematic view for describing the method of manufacturing the tire according to the embodiment.

In FIG. 8, the other members than the cap rubber 3 are not illustrated. For example, the rubber member constructing the base rubber 4 may be wound to the winding portion 43, and the ribbon rubbers 5 and 6 may be wound from the above of the rubber member.

Thereafter, the first and second ribbon rubbers 5 and 6 are wound to form three layers in the tire radial direction D2, although not being illustrated. Further, an unvulcanized tire is formed, for example, via a step of being expanded and deformed. Further, since the unvulcanized tire is vulcanized by a vulcanizing device, the vulcanized tire 1 is manufactured.

As described above, the tire 1 of the embodiment include: a tread rubber 2 which is grounded on a road surface in an outer peripheral surface thereof, wherein the tread rubber 2 includes a first layer 3a which is grounded on the road surface in an outer peripheral surface thereof, and a second layer 3b which is joined to an inner peripheral surface of the first layer 3a in an outer peripheral surface thereof, wherein the first layer 3a includes a joint portion 10 and 11 where rubbers 7 and 8 having different elastic modulus are joined, and wherein the second layer 3b is formed by a rubber 9 having a greater elastic modulus than an elastic modulus of at least one of the rubbers 7 and 8 constructing the first layer 3a.

According to the structure mentioned above, the first layer 3a is provided with the joint portions 10 and 11 to which the rubbers 7 and 8 having the different elastic modulus are joined. Further, since the joint portions 10 and 11 are elastically deformed in such a manner as to strain when the tire 1 travels, the joint portions 10 and 11 generate heat. As a result, it is possible to raise the temperature of the tread rubber 2 at an early stage of the operation.

Further, the outer peripheral surface of the second layer 3b is joined to the inner peripheral surface of the first layer 3a. Further, the second layer 3b is formed by the rubber 9 having the elastic modulus which is greater than the elastic modulus of at least one of the rubbers 7 and 8 which construct the first layer 3a. As a result, it is possible to reduce the rigidity difference caused by the different elastic modulus of the rubbers 7 and 8 in the first layer 3a. Therefore, since it is possible to inhibit the deformation difference caused by the different elastic modulus of the rubbers 7 and 8 in the first layer 3a from being enlarged, it is possible to inhibit the contact pressure with the road surface from being uneven.

In the tire 1 of the embodiment, the tread rubber 2 includes a third layer 3c which is joined to an inner peripheral surface of the second layer 3b in an outer peripheral surface thereof, and wherein the third layer 3c includes a joint portion 10 and 11 where the rubbers 7 and 8 having the different elastic modulus are joined.

According to the structure mentioned above, the outer peripheral surface of the third layer 3c is joined to the inner peripheral surface of the second layer 3b. Further, the third layer 3c is provided with the joint portions 10 and 11 to which the rubbers 7 and 8 having the different elastic modulus are joined. As a result, since the joint portions 10 and 11 are elastically deformed in such a manner as to strain when the tire 1 travels, the joint portions 10 and 11 generate heat. Therefore, since the heat is generated not only in the first layer 3a but also in the third layer 3c, it is possible to further raise the temperature of the tread rubber 2 at an early stage of the operation.

In the tire 1 of the embodiment, the tread rubber 2 includes a peripheral groove 27 which extends along a tire peripheral direction D3, and the third layer 3c is arranged in such a manner as to include a position P1 of a groove bottom 27a of the peripheral groove 27 in a tire radial direction D2.

According to the structure mentioned above, the third layer 3c is arranged in such a manner as to include the position P1 of the groove bottom 27a of the peripheral groove 27 in the tire radial direction D2. As a result, since the joint portions 10 and 11 of the third layer 3c are arranged in the groove bottom 27a of the peripheral groove 27 which tends to come to the starting point of the compressive deformation, it is possible to effectively generate heat in the third layer 3c. Therefore, it is possible to effectively raise the temperature of the tread rubber 2 at an early stage of the operation.

In the tire 1 of the embodiment, the joint portion 10 and 11 includes a peripheral joint portion 10 where the rubbers 7 and 8 having the different elastic modulus are joined in a tire peripheral direction D3, and a width joint portion 11 where the rubbers 7 and 8 having the different elastic modulus are joined in a tire width direction D1.

According to the structure mentioned above, since the peripheral joint portion 10 joins the rubbers 7 and 8 having the different elastic modulus in the tire peripheral direction D3, the tire 1 is deformed in the tire peripheral direction D3 and the peripheral joint portion 10 generates heat. Further, since the width joint portion 11 joins the rubbers 7 and 8 having the different elastic modulus in the tire width direction D1, the tire 1 is deformed in the tire width direction D1 and the width joint portion 11 generates heat. As a result, since the tire 1 is deformed in the tire peripheral direction D3 and the tire width direction D1 at an early state of the operation, it is possible to effectively raise the temperature of the tread rubber 2.

In the tire 1 of the embodiment, the elastic modulus of the rubber 9 which forms the second layer 3b is different from the elastic modulus of all the rubbers 7 and 8 which form the first layer 3a.

According to the structure mentioned above, since the elastic modulus is different between the rubbers 7 and 8 which form the first layer 3a and the rubber 9 which forms the second layer 3b, the radial joint portion 12 joining the rubbers 7 to 9 having the different elastic modulus in the tire radial direction D2 is formed between the first layer 3a and the second layer 3b. Further, the radial joint portion 12 generates heat since the tire 1 is deformed in the tire radial direction D2. As a result, it is possible to further effectively raise the temperature of the tread rubber 2 at an early state of the operation.

In the tire 1 of the embodiment, the elastic modulus of the rubber 9 which forms the second layer 3b is greater than the elastic modulus of all the rubbers 7 and 8 which form the first layer 3a.

According to the structure mentioned above, since the elastic modulus of the rubber 9 which forms the second layer 3b is greater than the elastic modulus of all the rubbers 7 and 8 which form the first layer 3a, it is possible to further reduce the rigidity difference caused by the different elastic modulus of the rubbers 7 and 8 in the first layer 3a. Therefore, since it is possible to further inhibit the deformation difference caused by the different elastic modulus of the rubbers 7 and 8 in the first layer 3a from being enlarged when the tire 1 travels, it is possible to further inhibit the ground pressure with the road surface from being uneven.

The tire 1 is not limited to the configuration of the embodiment described above, and the effects are not limited to those described above. It goes without saying that the tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

The tire 1 according to the embodiment mentioned above is structured such that the first layer 3*a* and the third layer 3*c* are provided with the peripheral joint portion 10 and the width joint portion 11. However, the tire 1 is not limited to the structure mentioned above.

Figure 9:
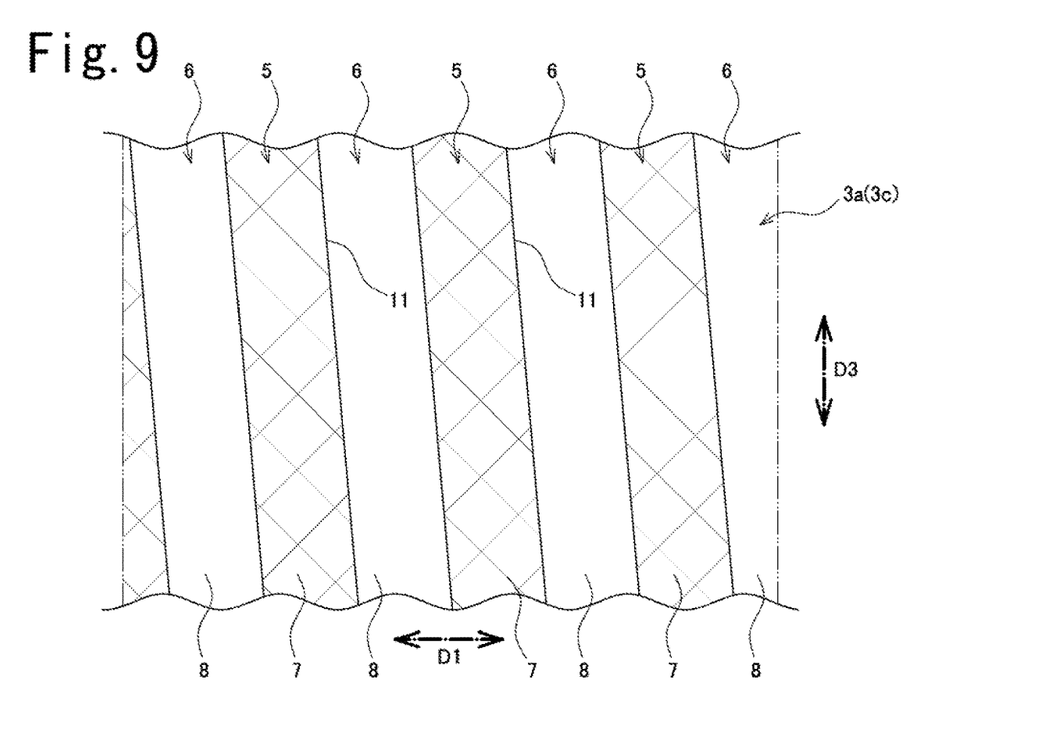
FIG. 9 is a development view of a substantial part of a first layer (a third layer) of a tread rubber according to another embodiment and is a view for describing a layout of the rubber.
Figure 10:
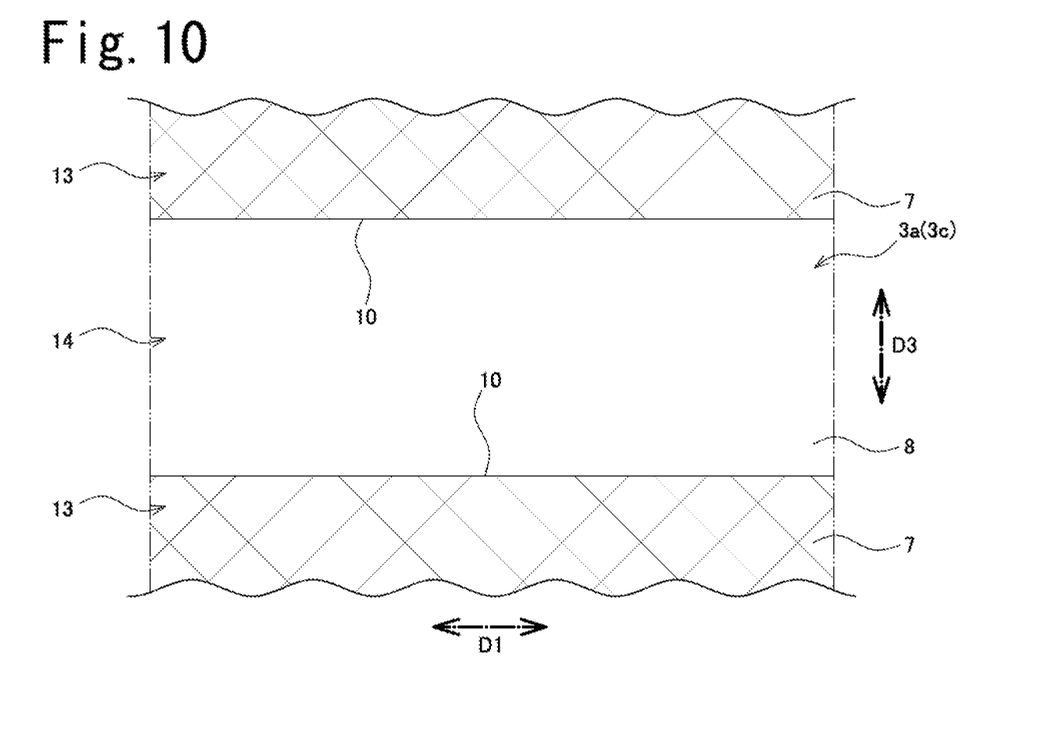
FIG. 10 is a development view of a substantial part of a first layer (a third layer) of a tread rubber according to still another embodiment and is a view for describing a layout of the rubber.

The tire 1 may be structured, for example, such that at least one of the first layer 3*a* and the third layer 3*c* is provided only with the width joint portion 11 in which the intersecting angle in relation to the tire peripheral direction D3 is less than 10 degrees as shown in FIG. 9 and is not provided with the peripheral joint portion 10. Further, the tire 1 may be structured, for example, such that at least one of the first layer 3*a* and the third layer 3*c* is provided only with the peripheral joint portion 10 as shown in FIG. 10 and is not provided with the width joint portion 11.

Further, the tire 1 according to the embodiment mentioned above is structured such that the peripheral joint portion 10 is arranged so as to be inclined and intersect in relation to the tire peripheral direction D3. However, the tire 1 is not limited to the structure mentioned above. The tire 1 may be structured, for example, such that the peripheral joint portion 10 is arranged so as to be orthogonal and intersect in relation to the tire peripheral direction D3, as shown in FIG. 10.

Further, the tire 1 according to the embodiment mentioned above is structured such that a part (the cap rubber 3) of the tread rubber 2 is formed by winding the cord-shaped ribbon rubbers 5 and 6. However, the tire 1 is not limited to the structure mentioned above. For example, the tire 1 may be structured such that at least a part of the tread rubber 2 is formed by connecting the sheet-shaped sheet rubbers 13 and 14 in the tire peripheral direction D3 as shown in FIG. 10.

Further, the tire 1 according to the embodiment mentioned above is structured such that the dimensions in the tire radial direction D2 of the first rubber 7 and the second rubber 8 in the first layer 3*a* are fixed (including approximately the same in addition to completely the same). However, the tire 1 is not limited to the structure mentioned above. The tire 1 may be structured, for example, such that the dimensions in the tire radial direction D2 of the first rubber 7 and the second rubber 8 in the first layer 3*a* are different, as shown in FIG. 11.

Figure 11:
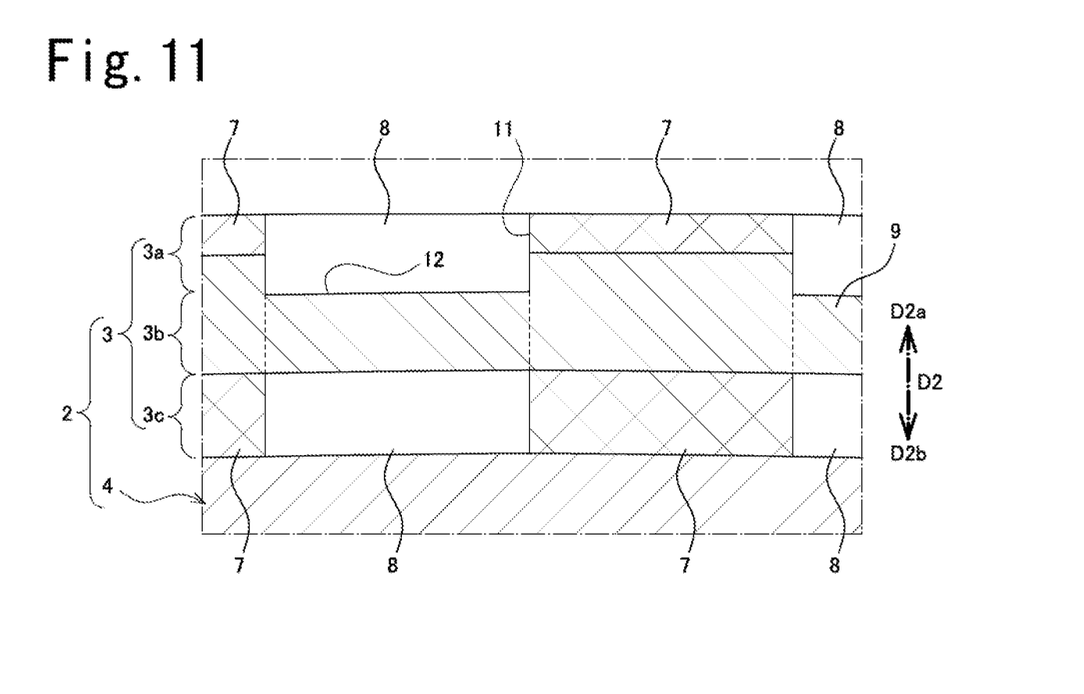
FIG. 11 is an enlarged cross sectional view of a substantial part in a tire meridian surface of a tread rubber according to still another embodiment and is a view for describing a layout of the rubber.

In the first layer 3*a* according to FIG. 11, the dimension in the tire radial direction D2 of the first rubber 7 having the smaller elastic modulus is smaller than the dimension in the tire radial direction D2 of the second rubber 8 having the greater elastic modulus. According to the structure mentioned above, it is possible to effectively reduce the rigidity difference caused by the different elastic modulus of the rubbers 7 and 8 in the first layer 3*a*. Therefore, since it is possible to effectively inhibit the deformation difference caused by the different elastic modulus of the rubbers 7 and 8 in the first layer 3*a* from being enlarged when the tire 1 travels, it is possible to effectively inhibit the ground pressure on the road surface from being uneven.

Further, the tire 1 according to the embodiment mentioned above is structured such that the tread rubber 2 has the four-layer structure which is constructed by the first to third layers 3*a* to 3*c* of the cap rubber 3 and the base rubber 4. However, the tire 1 is not limited to the structure mentioned above. The tire 1 may be structured, for example, such that the tread rubber 2 has a two-layer structure, a three-layer structure or a multi-layer structure having five or more layers.

Further, the tire 1 according to the embodiment mentioned above is structured such that the third layer 3*c* is arranged in such a manner as to include the position P1 of the groove bottom 27*a* of the peripheral groove 27 in the tire radial direction D2. However, the tire 1 is not limited to the structure mentioned above. The tire 1 may be structured, for example, such that the third layer 3*c* is arranged so as to be deviated from the position P1 of the groove bottom 27*a* of the peripheral groove 27 in the tire radial direction D2.

Further, the tire 1 according to the embodiment mentioned above is structured such that the elastic modulus of the rubber 9 which forms the second layer 3*b* is different from the elastic modulus of all the rubbers 7 and 8 which form the first layer 3*a*. However, the tire 1 is not limited to the structure mentioned above. The tire 1 may be structured, for example, such that the elastic modulus of the rubber 9 which forms the second layer 3*b* is the same as the elastic modulus of one of the rubbers 7 and 8 which form the first layer 3*a*, and is greater than the elastic modulus of at least one of the rubbers 7 and 8 which construct the first layer 3*a*.

Further, the tire 1 according to the embodiment mentioned above is structured such that the elastic modulus of the rubber 9 which forms the second layer 3*b* is greater than the elastic modulus of all the rubbers 7 and 8 which form the first layer 3*a*. However, the tire 1 is not limited to the structure mentioned above. The tire 1 may be structured, for example, such that the elastic modulus of the rubber 9 which forms the second layer 3*b* is greater than the elastic modulus of one of the rubbers 7 and 8 which form the first layer 3*a*, and is smaller than the elastic modulus of the other.

Further, the tire 1 according to the embodiment mentioned above is structured such that the first layer 3*a* and the third layer 3*c* are formed by a plurality of rubbers 7 and 8 having the different elastic modulus. However, the tire 1 is not limited to the structure mentioned above. The tire 1 may be structured, for example, such that only the first layer 3*a* is formed by a plurality of rubbers 7 and 8 having the different elastic modulus.

Further, the tire 1 according to the embodiment mentioned above is structured such that the peripheral joint portions 10 of the first layer 3*a* and the third layer 3*c* are arranged so as to be away at the distance corresponding to 180 degrees in the tire peripheral direction D3. However, the tire 1 is not limited to the structure mentioned above. The tire 1 may be structured, for example, such that the peripheral joint portions 10 of the first layer 3*a* and the third layer 3*c* are arranged such as to be away from the peripheral joint portions 10 which are adjacent in the tire peripheral direction D3, at a distance corresponding to 15 degrees to 180 degrees in the tire peripheral direction D3.

Further, the tire 1 according to the embodiment mentioned above is structured such that the peripheral joint portion 10 is formed by two rubbers 7 and 8 having the different elastic modulus. However, the tire 1 is not limited to the structure mentioned above. The tire 1 may be structured, for example, such that the peripheral joint portions 10 are respectively formed by two kinds of rubber which are selected from three or more kinds of rubber having different elastic modulus.

More specifically, the tire 1 may be structured such that at least one of the first layer 3a and the third layer 3c is formed by three or more kinds of rubber having the different elastic modulus.

Further, the tire 1 includes the tire before being vulcanized (the unvulcanized tire) and the tire after being vulcanized (the vulcanized tire). In the tire after being vulcanized, the boundary surfaces of the rubbers 7 to 9 can be observed by the cross sections which are obtained by cutting the tire 1 with a sharp cutting tool. As a result, it is possible to specify the arranged state of the rubbers 7 to 9.

What is claimed is:

1. A tire comprising:
    a tread rubber which is grounded on a road surface in an outer peripheral surface thereof,
    the tread rubber includes a first layer which is grounded on the road surface in an outer peripheral surface thereof, a second layer which is joined to an inner peripheral surface of the first layer in an outer peripheral surface thereof, and a third layer which is joined to an inner peripheral surface of the second layer in an outer peripheral surface thereof,
    wherein the first layer includes a joint portion where rubbers having different elastic modulus are joined,
    the second layer is formed by a rubber having a greater elastic modulus than an elastic modulus of at least one of the rubbers constructing the first layer, and
    the third layer includes a joint portion where the rubbers having the different elastic modulus are joined.

2. The tire according to claim 1, wherein the tread rubber includes a peripheral groove which extends along a tire peripheral direction, and
    wherein the third layer is arranged in such a manner as to include a position of a groove bottom of the peripheral groove in a tire radial direction.

3. The tire according to claim 1, wherein the joint portion includes a peripheral joint portion where the rubbers having the different elastic modulus are joined in a tire peripheral direction, and a width joint portion where the rubbers having the different elastic modulus are joined in a tire width direction.

4. The tire according to claim 3, wherein the first layer is formed by spirally winding a plurality of ribbon rubbers along a tire peripheral direction,
    wherein the ribbon rubbers are provided with parallel portions which are arranged in parallel to the tire peripheral direction, and inclined portions which are arranged so as to be inclined to the tire peripheral direction,
    wherein the peripheral joint portions are formed so that the inclined portions are joined to each other in the tire peripheral direction, and
    wherein the width joint portions are formed by joining the parallel portions to each other in the tire width direction.

5. The tire according to claim 1, wherein the elastic modulus of the rubber which forms the second layer is different from the elastic modulus of all the rubbers which form the first layer.

6. The tire according to claim 5, wherein the elastic modulus of the rubber which forms the second layer is greater than the elastic modulus of all the rubbers which form the first layer.

7. The tire according to claim 1, wherein a dimension of the second layer in a tire radial direction is equal to or less than a dimension of the first layer in the tire radial direction.

8. The tire according to claim 1, wherein the elastic modulus of the rubber which forms the second layer is different from the elastic modulus of all the rubbers which form the third layer.

9. The tire according to claim 8, wherein the elastic modulus of the rubber which forms the second layer is greater than the elastic modulus of all the rubbers which form the third layer.

10. The tire according to claim 1, wherein a dimension of the second layer in a tire radial direction is equal to or less than a dimension of the third layer in the tire radial direction.

11. The tire according to claim 1, wherein the first layer is formed by first and second rubbers having different elastic modulus,
    wherein the elastic modulus of the first rubber is smaller than the elastic modulus of the second rubber, and
    wherein a dimension in a tire radial direction of a portion which is formed by the first rubber in the first layer is smaller than a dimension in the tire radial direction of a portion which is formed by the second rubber in the first layer.

* * * * *